March 6, 1951  J. E. LOVI ET AL  2,543,860
FLASH BULB SYNCHRONIZATION TESTER FOR CAMERAS
Filed Nov. 13, 1947  2 Sheets-Sheet 1

Inventors
Joseph E. Lovi
Frederick G. Hitzman

By Clarence A. O'Brien
and Harvey B. Jacobson
Attorneys

March 6, 1951 J. E. LOVI ET AL 2,543,860
FLASH BULB SYNCHRONIZATION TESTER FOR CAMERAS
Filed Nov. 13, 1947 2 Sheets—Sheet 2

Inventors
Joseph E. Lovi
Frederick G. Hitzman

By Clarence A. O'Brien
and Harvey B. Jacobson
Attorneys

Patented Mar. 6, 1951

2,543,860

UNITED STATES PATENT OFFICE 2,543,860

FLASH BULB SYNCHRONIZATION TESTER
FOR CAMERAS

Joseph E. Lovi and Frederick G. Hitzman,
Chicago, Ill.

Application November 13, 1947, Serial No. 785,728

1 Claim. (Cl. 73—5)

The present invention relates to new and useful improvements in means for testing the synchronization of flash bulbs with the shutter of a camera and more particularly to an attachment for insertion in the flash bulb receptacle or socket of a camera after the flash bulb has been removed therefrom, whereby the action of the shutter and testing lamp may be observed to check the synchronization thereof.

A further object of the invention is to provide a testing attachment of this character whereby the synchronization of the camera shutter and flash bulb may be observed without requiring the use of a dark room and substituting a conventional flashlight bulb for the flash bulb of the camera to eliminate the expense of the relatively costly flash bulb during the testing operation.

Another object is to provide a testing apparatus of this character wherein a relatively inexpensive flashlight bulb may be used in the testing operation and wherein the flashlight bulb may be used a number of times without replacing.

A still further object is to provide a flash bulb testing apparatus of this character which may be attached in position to a flashlight camera in place of the conventional flash bulb and without necessitating any changes or alterations in the flash bulb attachment.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figures 1, 5:
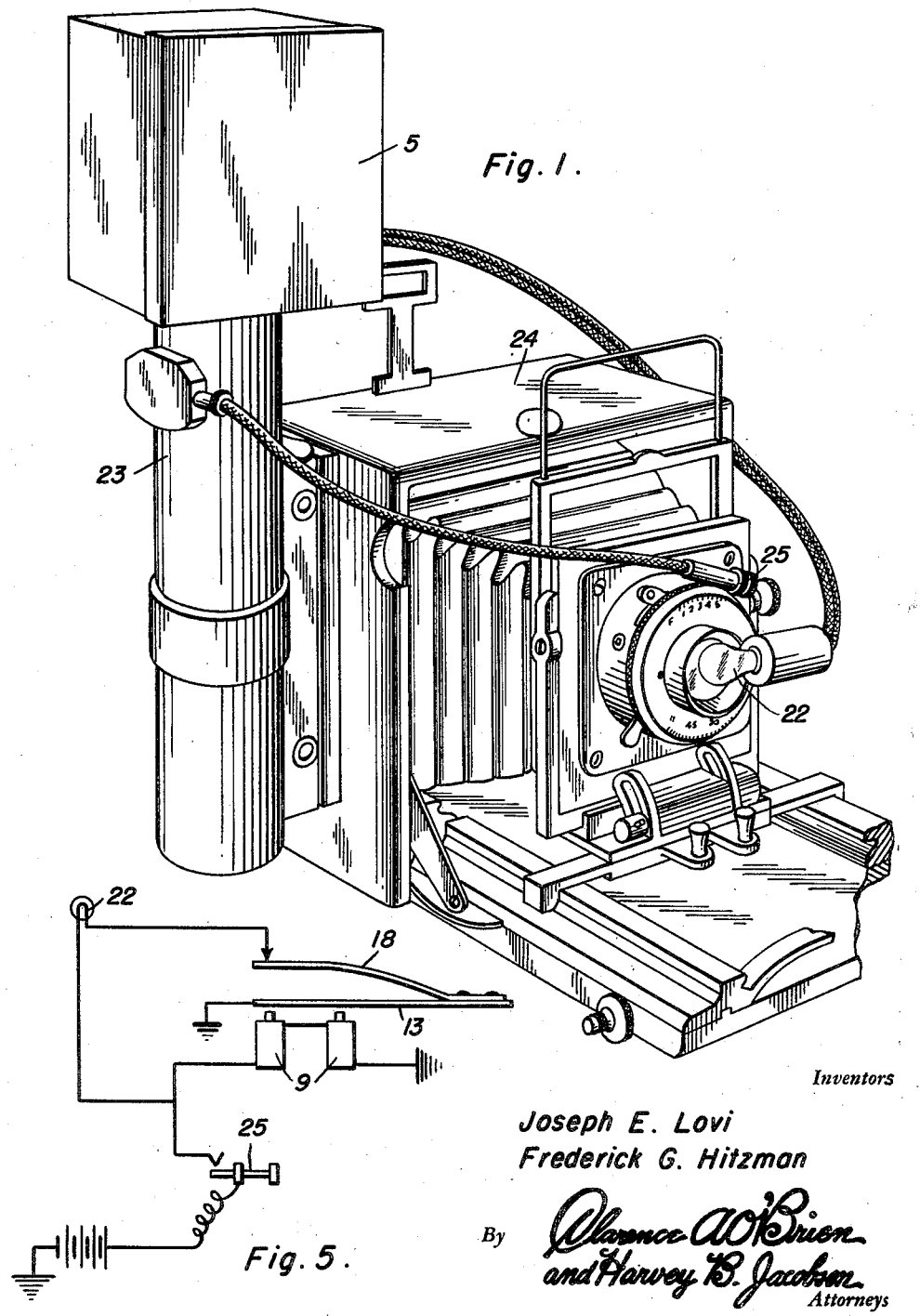
Figure 1 is a perspective view of a flashlight camera with the testing attachment in position thereon.
Figure 5 is a diagram of the electric circuit for the testing device.
Figure 2:
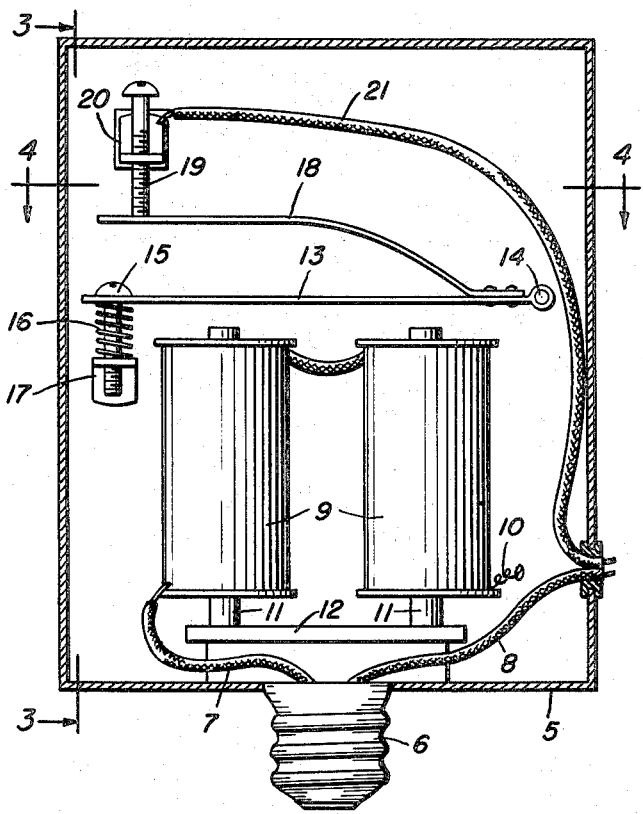
Figure 2 is an enlarged vertical sectional view of the housing for the attachment and showing the delayed action circuit breaker for the testing lamp.
Figure 3:
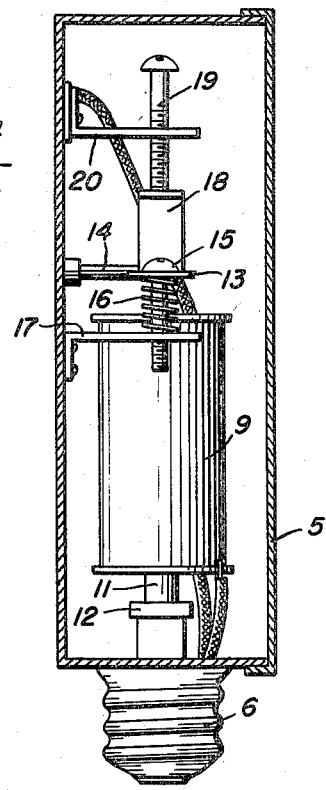
Figure 3 is a vertical sectional view taken on a line 3—3 of Figure 2.
Figure 4:
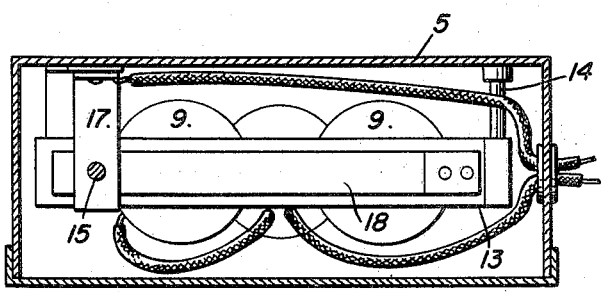
Figure 4 is a transverse sectional view taken on a line 4—4 of Figure 2.

Referring now to the drawings in detail wherein, for the purpose of illustration, we have disclosed a preferred embodiment of the invention, the numeral 5 designates a case which can be made of any suitable shape and to the bottom of which is suitably secured a conventional electric plug 6 for insertion in a lamp receptacle or socket.

The circuit connections leading from the plug are shown at 7 and 8, the circuit connection 7 being electrically connected to one or more solenoids 9 which are grounded to the casing or other ground, as shown at 10. The solenoids are connected to each other in series and with one end of the cores 11 connected to each other by a soft iron bar 12 to provide a magnetic path.

A circuit breaker including a soft iron bar 13 is pivoted at one end, as at 14, to the casing 5 and disposed in the path of attraction of the other ends of the cores 11. The other end of the bar 13 is slidably mounted on an adjustable screw 15 and held against the head of the screw by a coil spring 16, the screw being threaded in a bracket 17 grounded to the casing 5. The spring 16 normally holds the bar 13 spaced from the cores 11.

A leaf spring 18 is secured at one end to the bar 13 adjacent the pivot 14 thereof and the other end of the spring is spaced from the bar 13 and yieldably held against an adjusting screw 19 threaded in a bracket 20 insulated from the casing and which forms a terminal for a circuit wire 21 leading to a conventional flashlight lamp 22, the wire 8 forming the other circuit connection for the lamp.

In the operation of the device, the usual flash bulb is removed from the flash bulb receptacle carried at the upper end of a battery case 23 which is attached to one side of a camera 24. If necessary, the reflector for the flash bulb may also be removed and the plug 6 inserted in the flash bulb receptacle, as shown in Figure 1 of the drawings.

The plates or film pack are removed from the camera and the operator looks through the back of the camera while holding the bulb 22 in front of the lens. The flash bulb and shutter operating switch 25 for the usual flashlight attachment is then closed and the solenoids 9 and lamp 22 are simultaneously energized. A magnetic flux is set up in the solenoid which attracts the bar 13 of the circuit breaker and to which spring 18 is attached, thereby breaking the circuit for the lamp with a delayed action.

If the flash of light from the lamp 22 is seen through the shutter of the camera, the camera shutter and flash bulb are in synchronization, and if no light is seen, then the usual solenoid which operates the camera shutter is adjusted and the closing of the flash bulb switch 25 is repeated to again energize the lamp 22 and solenoids 9 until the proper synchronization is obtained.

The plug 6 is then removed and replaced by the usual flash lamp, the camera loaded and is ready for use.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A flash bulb synchronization testing device for cameras of the type having a flash bulb receptacle and a combined flash bulb and shutter operating switch comprising a casing having a plug connector rigid with and projecting from the casing and engaging in the flash bulb receptacle, a solenoid and a circuit breaker mounted in the casing and connected to the terminals of the plug, a lamp in operative connection with a contact member engageable by said circuit breaker, said circuit breaker comprising a pivoted bar actuated by the solenoid and a resilient contact arm secured to said bar, said bar being biased away from said solenoid by resilient means, said contact arm normally engaging said contact member, but upon closing of said switch said lamp is energized, said solenoid is energized drawing said bar thereto and disengaging said contact arm from said contact member, thus de-energizing said lamp, said resilient means and said contact member being selectively adjustable to produce a desired time lag between the time of energization and de-energization of the lamp.

JOSEPH E. LOVI.
FREDERICK G. HITZMAN.

REFERENCES CITED

The following references are of record in the file of this patent:

UNITED STATES PATENTS

| Number | Name | Date |
|---|---|---|
| 476,330 | Thomson | June 7, 1892 |
| 570,406 | Johnson | Oct. 27, 1896 |
| 1,322,254 | McNicol | Nov. 18, 1919 |
| 2,286,512 | Schwartz et al. | June 16, 1942 |
| 2,296,676 | Kearsley | Sept. 22, 1942 |
| 2,332,587 | Mendelsohn et al. | Oct. 26, 1943 |